UNITED STATES PATENT OFFICE.

ARTHUR HAUSDÖRFER, OF ELBERFELD, AND CARL HEIDENREICH, OF LEVERKUSEN, GERMANY, ASSIGNORS TO FARBENFABRIKEN VORM. FRIEDR. BAYER & CO., OF ELBERFELD, GERMANY, A CORPORATION OF GERMANY.

TRIPHENYLMETHANE DYE.

1,021,366.   Specification of Letters Patent.   Patented Mar. 26, 1912.

No Drawing.   Application filed October 31, 1911.   Serial No. 657,704.

*To all whom it may concern:*

Be it known that we, ARTHUR HAUSDÖRFER and CARL HEIDENREICH, doctors of philosophy, chemists, citizens of the German Empire, residing, respectively, at Elberfeld and Leverkusen, Germany, have invented new and useful Improvements in Triphenylmethane Dye, of which the following is a specification.

In United States Patent No. 980251 we have described generally dyestuffs obtainable by reacting with the diazo compounds of the triphenylmethane leuco compounds derived from an aminobenzaldehyde and an aromatic oxy-carboxylic acid upon an azo dyestuff component and oxidizing the leuco compounds. In the present application we wish to specifically describe and claim the product made from 2.6-dichloro-5-aminobenzaldehyde-ortho-cresotinic acid and 1-sulfophenyl-3-methyl-5-pyrazolone having most probably the formula:

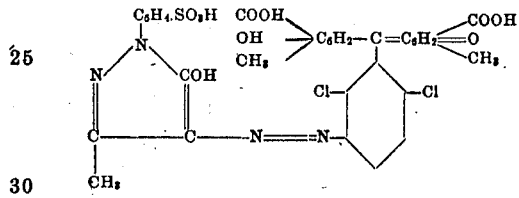

In order to illustrate the new process more fully the following example is given, the parts being by weight:—72 parts of the leuco compound obtained from 1 molecule of 2.6-dichloro-5-aminobenzaldehyde and 2 molecules of ortho-cresotinic acid are dissolved in 300 parts of concentrated sulfuric acid and are then diazotized by means of a solution of 10.5 parts of sodium nitrite in 200 parts of concentrated sulfuric acid. To produce the coloring matter from the diazoleuco compound after 1 to 2 hours a solution of 10.5 parts of sodium nitrite in 200 parts of concentrated sulfuric acid is added. The mixture is then warmed to 35–40° C. during 15–20 hours until the oxidation is complete. The red solution is poured on ice, the precipitate is filtered off, washed with water and then with a 1 per cent. sulfuric acid. The diazo compound is stirred up with 600 parts of ice water and added to a solution of 40.25 parts of 1-sulfophenyl-3-methyl-5-pyrazolone in 40 parts of sodium carbonate and 400 parts of water. When the copulation is complete the mixture is heated to 60° C., the dye is precipitated with common salt, filtered off and dried.

The new dye is a red powder easily soluble in water with a yellow coloration. It dyes wool from acid baths red-brown shades which on being treated with bichromate change into a green fast to fulling, potting and light.

We claim:—

The herein-described new dyestuff having most probably the formula:

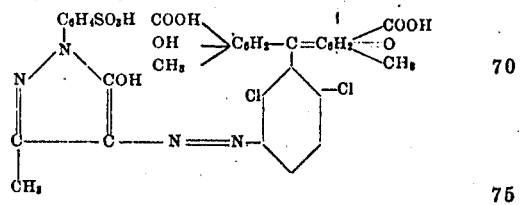

which dyestuff is in the shape of its sodium salt after being dried and pulverized a red powder easily soluble in water with a yellow coloration; dyeing wool from acid baths red-brown shades which on being treated with bichromate change into a green fast to fulling, potting and light, substantially as described.

In testimony whereof we have hereunto set our hands in the presence of two subscribing witnesses.

ARTHUR HAUSDÖRFER. [L. S.]
CARL HEIDENREICH. [L. S.]

Witnesses:
A. NUFER,
HELEN NUFER.